July 31, 1956  H. A. MATTHIAS ET AL  2,757,017
INDEPENDENT WHEEL SUSPENSION FOR MOTOR VEHICLES
Filed Oct. 12, 1953

H.A. MATTHIAS
G.H. MULLER
INVENTORS

BY E. C. McRae
J. L. Faulkner
J. H. Oster

ATTORNEYS 2,757,017

Patented July 31, 1956

2,757,017

INDEPENDENT WHEEL SUSPENSION FOR MOTOR VEHICLES

Hans A. Matthias, Birmingham, and George H. Muller, Northville, Mich., assignors to Ford Motor Company, Dearborn, Mich., a corporation of Delaware Application October 12, 1953, Serial No. 385,312

6 Claims. (Cl. 280—124)

This invention relates generally to independent wheel suspensions for motor vehicles, and has particular reference to an independent wheel suspension incorporating torsion bars pivotally connected to the vehicle frame.

It is an object of the present invention to provide a motor vehicle wheel suspension utilizing a pair of longitudinally extending torsion bars one adjacent each side frame rail, with each torsion bar being connected at its rearward end to the wheel supporting member and connected at its forward end to the vehicle frame in such manner as to permit pivotal movement of the torsion bar about a horizontal transversely extending axis while preventing rotation of said torsion bar about its own axis. In an embodiment of the invention a transversely extending tubular cross member extends through aligned holes in the vertical side walls of box section side frame rails at opposite sides of the vehicle, the ends of the tubular cross member receiving externally threaded bushings which are also internally threaded for pivotal connection to the threaded shanks of torsion bar pivot supports to which the forward ends of the longitudinally extending torsion bars are nonrotatably anchored. The ends of the tubular cross member are insulated from the frame by means of rubber bushings clamped and held in position by the end flanges of the threaded bushings. This construction provides an economically manufactured and assembled mounting for the forward ends of the torsion bars, insuring free pivotal movement about a common transversely extending axis and maintaining proper alignment of the wheel suspension while at the same time efficiently insulating the suspension from the vehicle frame.

Other objects and advantages of this invention will be made more apparent as this description proceeds, particularly when considered in connection with the accompanying drawings, wherein.

Figures 1, 2:
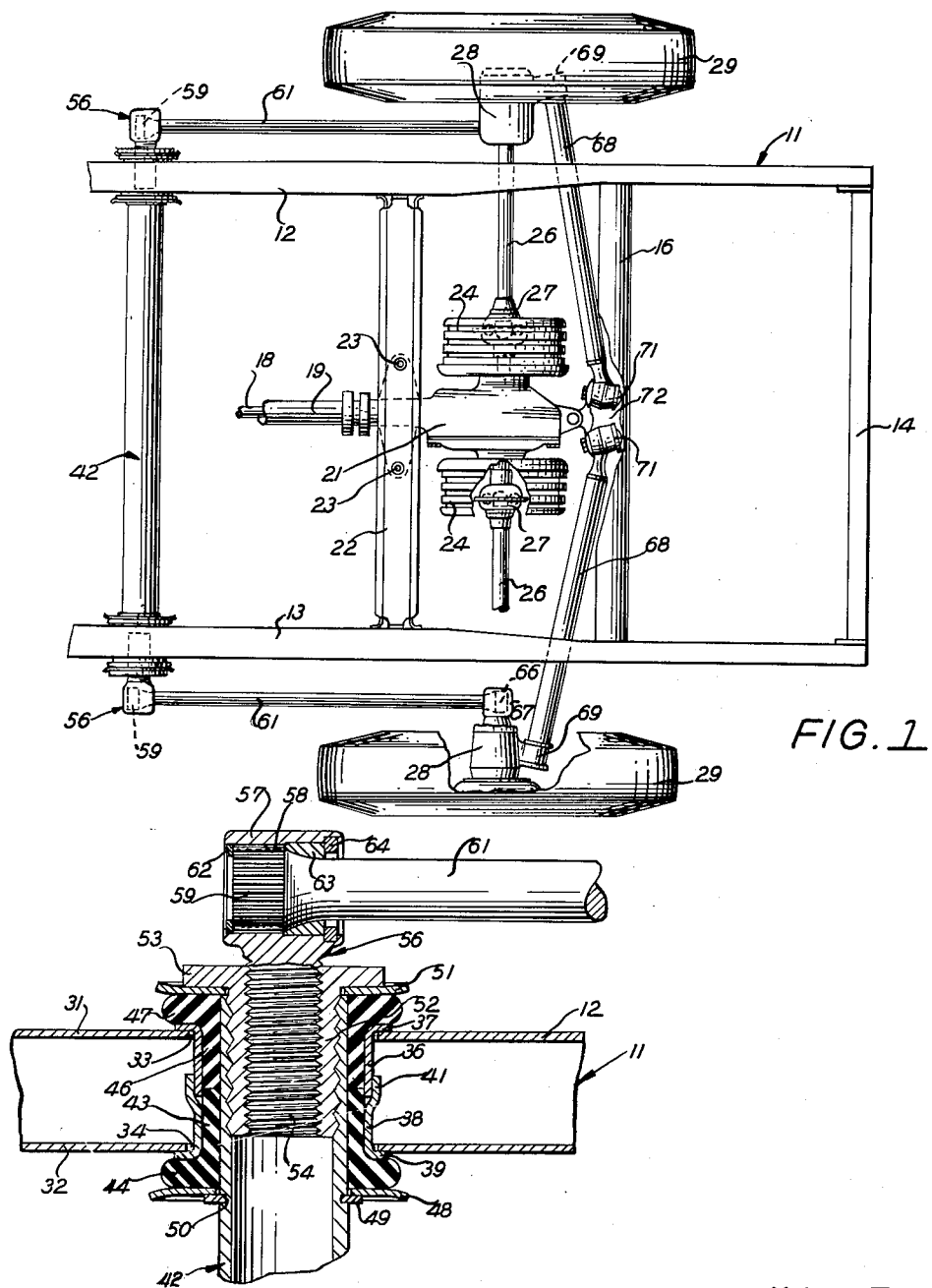
Figure 1 is a plan view of the rearward portion of a motor vehicle chassis embodying the present invention.
Figure 2 is an enlarged fragmentary cross-sectional view through the mounting for the forward end of the right hand longitudinally extending torsion bar.

Reference is made herein to the copending application of E. S. MacPherson, Serial No. 362,510, for Independent Wheel Suspension for Motor Vehicles, and assigned to the assignee of the present application. The present invention constitutes a modification of the construction shown in this copending application.

Referring now to the drawings, the reference character 11 indicates generally the frame of a motor vehicle having side frame rails 12 and 13 joined at their rearward ends by a frame cross member 14. Spaced forwardly of the rear cross frame member 14 is another cross frame member 16 extending generally transversely and secured at its outer ends to the side frame rails 12 and 13. The cross frame member 16 is tubular in cross section.

Power from the vehicle engine (not shown) is transmitted through a propeller shaft 18 contained within a torque tube 19 to conventional differential and drive gearing contained within a central housing 21. The central housing 21 is resiliently supported upon the cross frame member 22 of the vehicle chassis 11 by means of resilient mounts 23.

The differential housing 21 supports conventional brake units 24 on opposite side thereof. A pair of driven axle shafts 26 are connected by universal joints 27 to the differential and drive gear assembly 21, and extend outwardly to wheel supports or hubs 28 for the rear wheels 29.

Figure 2 illustrates a portion of the construction of the present invention adjacent the right hand side frame rail 12, and it will be understood that the corresponding construction at the opposite side of the vehicle adjacent the left hand side frame rail 13 is identical except for being reversed. Consequently only the construction at one side of the vehicle, as illustrated in Figure 2, will be described in detail.

The side frame rail 12 is of box section and has vertically extending side walls 31 and 32 which are provided with aligned circular apertures 33 and 34 respectively. A sleeve 36 having an end flange 37 is inserted into the aperture 33 in the outer side wall 31 of the frame rail with the end flange 37 abutting the side flange of the rail, and is welded in place. A second sleeve 38 is inserted through the aperture 34 in the inner side flange 32 of the frame rail and is formed with an end flange 39 abutting the adjacent flange of the rail. The inner end 41 of the sleeve 38 is enlarged to embrace the adjacent end of the sleeve 36, and it will be apparent that the two sleeves cooperate to form a unit.

Projecting completely across the vehicle frame between the side frame rails 12 and 13 thereof and extending through the aligned sleeves 36 and 38 therein is a tubular cross member 42. The outer ends of the tubular cross member 42 project somewhat beyond the outer side wall 31 of the frame rail at each side of the vehicle, and the diameter of the tubular cross member 42 is smaller than that of the sleeves 36 and 38 so as to provide a clearance space therebetween.

A rubber bushing 43 is inserted between the tubular cross member 42 and the sleeve 38 carried by the side frame rail and is provided with an enlarged end flange 44 overlying the inner wall 32 of the frame rail adjacent the aperture 34 therein and abutting the end flange 39 of the sleeve 38. A similar bushing 46 is inserted between the end of the tubular cross member 42 and the sleeve 36 carried by the side frame rail and is provided with an enlarged end flange 47 overlying the outer wall 31 of the frame rail and abutting the end flange 37 of the sleeve 36.

An arcuate washer 48 is sleeved over the tubular cross member 42 and abuts the end flange 44 of the inner rubber bushing 43 to form a stop therefor. The washer 48 is retained against axial movement along the tubular member 42 by means of a retaining ring 49 seated in an annular groove 50 in the tubular cross member. A second arcuate washer 51 is positioned adjacent the outer end of the tubular cross member 42 and abuts the end flange 47 of the outer rubber bushing 46. When held in this position it will be seen that the outer washer 51 cooperates with the inner washer 48 to clamp the rubber bushings 43 and 46 in position so as to form an efficient insulated mounting for the tubular cross member 42.

A metal bushing 52 having external flat obtuse angled threads formed on its shank is threaded into the outer end of the tubular cross member 42. The threaded bushing 52 is formed with an enlarged end flange 53 abutting the washer 51 to clamp the latter against the end of the tubular cross member 42 and the end flange 47 of the outer bushing 46.

The bushing 52 is conventionally internally threaded to receive and rotatably support the threaded shank 54 of the torsion bar end support 56. The end support 56 projects outwardly beyond the outer end flange 53 of the threaded bushing 52 and is formed with an enlarged head 57. The head 57 is provided with a bore 58 extending therethrough at right angles to the axis of the shank 54 of the end support and is splined to receive the enlarged splined end 59 of a longitudinally extending torsion bar 61. A split ring 62 at one end of the splined end portion 59 of the torsion bar cooperates with a formed block 63 and a split ring 64 at the opposite side of the splined end portion to retain the torsion bar against axial movement within the bore 58. The splined connection of course prevents rotation of the torsion bar about its own axis within the head 57 of the end support 56. The threaded connection between the shank 54 of the end support and the threaded bushing 52, however, permits bodily pivotal movement of the torsion bar 61 about the horizontal transversely extending axis of the tubular cross member 42.

A similar torsion bar 61 is provided at the opposite side of the vehicle and is connected to the frame side rail 13 in a similar manner so that it likewise is permitted rotation about the same transversely extending axis but is held against endwise movement and also rotative movement about the axis of the bar. The rearward end 66 of each torsion bar 61 is splined and nonrotatably received within an integral downwardly projecting extension 67 of the adjacent wheel hub 28.

Each rear wheel 29 is also provided with a generally transversely extending control arm 68. The outer end of each control arm 68 is received within an integral rearwardly projecting extension 69 of the wheel hub 28, is welded or otherwise nonrotatably secured thereto. At its inner end each control arm 68 is pivotally connected to an inverted U-shaped bracket 71 secured to a support 72 welded to the underside of the tubular cross frame member 16. The pivotal connection at the inner end of each control arm 68 is in alignment with the universal joint 27 and the forward splined end 59 of the torsion bar 61 to form a triangulated suspension such that during rising and falling movement of the vehicle wheel 29 the torsion bar 61 is placed in torsion to resiliently suspend the rear wheel. The torsion bars 61 and the control arms 68 cooperate to guide the wheels in predetermined paths during their rising and falling movements.

It will be understood that the invention is not to be limited to the exact construction shown and described, but that various changes and modifications may be made without departing from the spirit and scope of the invention, as defined in the appended claims.

What is claimed is:

1. In an independent suspension system for a motor vehicle having a pair of generally parallel longitudinally extending side frame rails interconnected near their rearward ends by a transversely extending cross frame member, a pair of supporting members one adjacent each side frame rail and each having means thereon to rotatably mount a wheel, a pair of transversely extending suspension arms each connected at its outer end to one of said wheel supporting members and at its opposite end to said transversely extending cross frame member, a tubular transversely extending cross member located forwardly of said wheel supporting members and extending through transversely aligned openings in said side frame rails, a flanged bushing having broad flat obtuse angled external threads threaded into each end of said tubular cross member, said bushings being internally threaded, a pivot support having a threaded shank threaded into each of said bushings and projecting laterally outwardly therefrom, and a pair of longitudinally extending torsion bars one adjacent each side frame rail and extending generally parallel thereto and rigidly connected at their rearward ends to said wheel supporting members, the forward ends of said torsion bars being nonrotatably anchored in the laterally outwardly projecting portions of said pivot members to anchor the forward ends of said torsion bars against rotation about their axes while permitting pivotal movement of said torsion bars about the horizontal transversely extending axis of said tubular cross frame member.

2. The structure defined by claim 1 which is further characterized in that tubular sleeves are positioned in the transversely aligned openings in said side frame rails, and rubber bushings are positioned between said sleeves and said tubular cross member.

3. In an independent suspension for a motor vehicle having a pair of generally parallel longitudinally extending side frame rails interconnected near their rear ends by a transversely extending cross frame member, a pair of supporting members one adjacent each side frame rail and each having means thereon to rotatably mount a road wheel, a pair of generally transversely extending suspension members each connected at its outer end to one of said wheel supporting members and at its opposite end to said cross frame member, said side frame rails being of box section and each having aligned circular openings in its vertical side walls with the openings in one frame rail being transversely aligned with the openings in the other frame rail, a short tubular sleeve unit extending between the opposite vertical side walls of each side frame rail in the aligned openings therein and secured to said frame rail, a pair of rubber bushings sleeved into said sleeve unit in each side frame rail from opposite sides thereof, each of said rubber bushings having a radially outwardly projecting end flange overlying the adjacent vertical side wall of the side frame rail beyond the limits of the circular opening formed therein, a long tubular cross member extending completely across said vehicle frame and having its opposite ends sleeved within the rubber bushings in each side frame rail, a pair of washers at each end of the tubular cross member abutting the end flanges of the pair of rubber bushings mounted adjacent thereto, a retaining ring holding the washer at the inner side of the side frame rail against movement axially of the tubular cross member, a bushing having broad flat obtuse angled external threads threaded into each end of said tubular cross member and having an integrally formed radially outwardly projecting end flange abutting the rubber bushing retaining washer at the outer side of the side frame rail to clamp the pair of rubber bushings between the pair of washers at opposite ends thereof and between the sleeve mounted in the side frame rail and the adjacent end portion of the tubular cross member, each of said bushings being relatively short and terminating at their inner end within the transverse limits of the pair of rubber bushings mounting at the adjacent end of the tubular cross member, said threaded bushings also being internally threaded, a pair of longitudinally extending torsion bars one adjacent the outer side of each side frame rail and extending generally parallel thereto and rigidly connected at its rearward end to the wheel supporting member, the forward end of each of said torsion bars being splined, and an end support for the forward end of each said torsions bars, each of said end supports having a threaded shank threaded into the threaded bushing at the end of the tubular cross member and also having an enlarged head projecting outwardly beyond the end of said tubular cross member, each of said enlarged heads having a longitudinally extending bore formed therein internally splined for nonrotatably receiving the splined forward end of the adjacent torsion bar to prevent rotation of said torsion bar about its longitudinally extending axis while permitting bodily rotation of said torsion bar about the horizontal transversely extending axis of said tubular cross member.

4. In an independent suspension system for a motor vehicle having a pair of generally parallel longitudinally extending side frame rails interconnected near their rearward ends by a transversely extending cross frame member, a pair of supporting members one adjacent each side frame rail and each having means thereon to rotatably mount a wheel, a pair of transversely extending suspension arms each connected at its outer end to one of said wheel supporting members and at its opposite end to said transversely extending cross frame member, a bushing supported upon each of said side frame rails forwardly of said wheel supporting members, said bushings being internally threaded and arranged in transverse horizontal alignment with each other, a pivot support having a threaded shank threaded into each of said bushings and projecting laterally outwardly therefrom, and a pair of longitudinally extending torsion bars one adjacent each side frame rail and connected at their rearward ends to said wheel supporting members, the forward ends of said torsion bars being non-rotatably connected to the laterally outwardly projecting portions of said pivot supports to anchor the forward ends of said torsion bars against rotation about their axes while permitting pivotal movement of said torsion bars about the common transverse axis of said bushings.

5. In an independent suspension system for a motor vehicle having a frame and a pair of road wheels, said frame having a pair of generally parallel longitudinally extending side frame rails, a pair of wheel supporting members for rotatably mounting said road wheels, a pair of generally transversely extending suspension arms each connected at its outer end to one of said wheel supporting members and at its inner end to said frame, a pair of longitudinally extending torsion bars one adjacent each side frame rail, said torsion bars being connected at their rearward end to said wheel supporting members, a pivot support at the forward end of each of said torsion bars, each of said pivot supports projecting toward the adjacent side frame rail from the torsion bar and being externally threaded, an internally threaded metal bushing rotatably receiving the externally threaded portion of each of said pivot supports, said bushings being mounted upon said frame in transverse horizontal alignment to permit bodily pivotal movement of said torsion bars about the common horizontal transverse axis of said bushing.

6. The structure defined by claim 5 which is further characterized in that said side frame rails are provided with transversely aligned openings therein for receiving said metal bushings, a sleeve surrounding each of said metal bushings and secured to the adjacent side frame rail, and rubber bushings positioned between said sleeves and said metal bushings.

References Cited in the file of this patent
UNITED STATES PATENTS
2,256,069   Wagner _____ Sept. 16, 1941